United States Patent
Drakos

(10) Patent No.: US 7,945,269 B2
(45) Date of Patent: May 17, 2011

(54) METHOD OF CARRIER ALLOCATION TO A PLURALITY OF CELLS IN A CELLULAR COMMUNICATION SYSTEM

(75) Inventor: Evripides Drakos, London (GB)

(73) Assignee: Inmarsat Global Limited, London (GB)

( * ) Notice: Subject to any disclaimer, the term of this patent is extended or adjusted under 35 U.S.C. 154(b) by 0 days.

(21) Appl. No.: 10/504,524

(22) PCT Filed: Feb. 14, 2003

(86) PCT No.: PCT/GB03/00680
§ 371 (c)(1),
(2), (4) Date: Jun. 1, 2005

(87) PCT Pub. No.: WO03/069936
PCT Pub. Date: Aug. 21, 2003

(65) Prior Publication Data
US 2006/0014543 A1    Jan. 19, 2006

(30) Foreign Application Priority Data
Feb. 15, 2002  (GB) .................................... 0203682.0

(51) Int. Cl.
*H04W 72/00* (2009.01)
(52) U.S. Cl. ...................................... 455/450; 455/452.1
(58) Field of Classification Search .................. 455/447, 455/450, 452.1
See application file for complete search history.

(56) References Cited

U.S. PATENT DOCUMENTS

| | | | | |
|---|---|---|---|---|
| 5,363,428 A | * | 11/1994 | Nagashima | 455/452.1 |
| 5,422,932 A | * | 6/1995 | Kay et al. | 455/452.1 |
| 5,734,983 A | * | 3/1998 | Faruque | 455/450 |
| 6,188,903 B1 | | 2/2001 | Gardner et al. | |
| 6,269,245 B1 | | 7/2001 | Li et al. | |
| 6,377,561 B1 | | 4/2002 | Black et al. | |

FOREIGN PATENT DOCUMENTS

| | | |
|---|---|---|
| GB | 2 366 962 A | 3/2002 |
| GB | 2385491 * | 8/2003 |
| WO | WO 99/14967 | 3/1999 |
| WO | WO 00/54532 | 9/2000 |
| WO | WO 02/11302 A2 | 2/2002 |

OTHER PUBLICATIONS

GB Search Report cited in Application No. GB0523195.6 dated Jan. 5, 2006, (issued Jan. 12, 2006). Search Report from Great Britain Application No. GB 0203682.0, dated Jul. 22, 2002, 3 pages.
Search Report from Great Britain Application No. GB 0203682.0, dated Sep. 5, 2002, 2 pages.
Rappaport, T.S., "Wireless Communications Principles and Practice," $2^{nd}$ Edition, *Prentiss Hall PTR*, 2002, pp. 57-63.

* cited by examiner

*Primary Examiner* — William D Cumming
(74) *Attorney, Agent, or Firm* — Sterne, Kessler, Goldstein & Fox PLLC

(57) ABSTRACT

In a carrier allocation scheme for a cellular communications system, cells are divided into groups of different types (CG1, CG2, CG3, CG4) and carriers ($f_{xyz}$) are divided into sets ($f_{1yz}$, $f_{2yz}$, $f_{3yz}$, $f_{4yz}$) allocated respectively to the different types. Carriers may be re-used between different groups of the same type, and optionally within a group, subject to a minimum re-use distance rule. The allocation patterns may be varied independently between different groups of the same type. The scheme may be adapted to the demand for carriers over a predetermined period. Different allocation schemes applied to different carriers may be overlaid on the same cells. Different allocation schemes may be applied to different cells, provided that the minimum re-use distance rule is obeyed between schemes. The scheme may be applied to spot beams of a satellite communications system, or cells of a terrestrial cellular system.

41 Claims, 14 Drawing Sheets

PRIOR ART

METHOD OF CARRIER ALLOCATION TO A PLURALITY OF CELLS IN A CELLULAR COMMUNICATION SYSTEM

TECHNICAL FIELD

The present invention relates to a method and apparatus for carrier allocation, involving re-use of carriers with spatial separation, such as a re-use scheme for a multi-beam satellite or terrestrial cellular communications system.

BACKGROUND TO THE INVENTION

A conventional terrestrial cellular frequency re-use scheme is illustrated in FIGS. 1 and 2. The available frequency spectrum is partitioned into frequency blocks f1 to f7 as shown in FIG. 2, each of which is assigned to a corresponding cell in a repeating cell cluster, as shown in FIG. 1. In this specific example, a hexagonal 7-cell cluster is used. The distance d in FIG. 1 represents the re-use distance of the cluster, in other words the centre-to-centre distance between cells to which the same frequency can be assigned. In this case, $d = \sqrt{7}D$ where D is separation between centres of adjacent cells. In any cellular re-use system, the minimum re-use distance is chosen so that the interference between channels assigned the same frequency in different cells is kept below an acceptable threshold.

The re-use factor of a particular cellular re-use scheme can be defined as the number of cells in which a particular carrier can be used, divided by the total number of cells. In the conventional scheme described above, the re-use factor is $\frac{1}{7}$. Other schemes may use 3, 4, 19 or some other number of cells per cluster, depending on the desired re-use distance. The conventional scheme is designed to maximize this re-use factor.

The conventional re-use scheme described above does not provide efficient use of carriers where the demand for carriers is uneven across the cell pattern. For example, there may be a demand for more carriers in one cell than in other cells within a cluster. However, it is not possible to allocate more carriers to that one cell, while satisfying the minimum re-use distance requirement, without making the same allocation of carriers to the corresponding cell in all the other clusters.

In cellular communications systems, traffic demand distributions vary according to various temporal and spatial factors such as time of day, distribution of terminals, type of communication, and one-off events. For example, in a beam pattern which extends across different countries and time zones, as is common with satellite beam patterns for example, peak traffic demand will occur at different times and different levels in different beams.

These problems can be overcome to some extent by dynamic carrier assignment algorithms, for example temporary 'borrowing' of carriers for one cell experiencing a high demand from an adjacent cell having a low demand, without violating the minimum re-use distance requirement. However, borrowing is spectrally inefficient and it is usually not possible or desirable to coordinate the borrowing of carriers across multiple cells. Alternatively or additionally, asymmetric reuse schemes can be devised.

The document U.S. Pat. No. 6,269,245 discloses a carrier allocation scheme for a satellite cellular system, in which a 7-cell cluster pattern is imposed on the beams. Each cell is assigned a demand value representing the demand for carriers in each cell. For each cell in turn, a 19-cell re-use zone is centred on that cell and the maximum demand values within the re-use zone are reduced until the total demand within the re-use zone is no greater than the total capacity of the satellite system. Next, a static allocation scheme is constructed by dividing the available channels into a 'preferred channel' set comprising three pools: a base demand pool for satisfying the minimum channel requirements of the cells, a maximum demand pool for satisfying the maximum channel requirements of the cells, and a community pool for satisfying extraordinary demand during anomalous events. The first and second pools are each divided into seven subpools for allocation to the corresponding cells within each 7-cell cluster. The community pool is not divided according to cell type. Channels are allocated in order of preference from the base demand pool, the maximum demand pool and the community pool. A dynamic allocation scheme is applied where the static scheme is unable to satisfy a demand in a specific cell. However, the first and second pools cannot be assigned flexibly to accommodate asymmetry in demand, while the community pool cannot be assigned with spectral efficiency because it is not divided according to cell type.

STATEMENT OF THE INVENTION

According to one aspect of the invention, there is provided a cluster re-use scheme which defines cell clusters of different types such that clusters of the same type are separated by at least a minimum re-use distance, wherein carriers are divided into a plurality of sets for allocation to the respective different cluster types. The allocation of carriers to cells within a cluster may be varied independently of the allocation within another cluster of the same type.

According to a second aspect of the present invention, there is provided a cluster group re-use scheme which defines cluster groups of different types such that cluster groups of the same type are separated by at least a minimum re-use distance, wherein carriers are divided into a respective plurality of sets for allocation to the respective cluster group types. Each cluster group comprises a plurality of cell clusters, and carriers may be re-used between cell clusters of the same cluster group according to a cell re-use scheme, which may vary between different cluster groups of the same type.

The first and second aspects of the invention may be applied to different subsets of a set of cells.

The first and second aspects of the invention may be applied to different sets of carriers in overlapping sets of cells.

The first and/or second aspects of the invention may be combined with a cell re-use scheme applied to further carriers. The cell re-use scheme may have a different clustering pattern from that of the first and/or second aspects, or the same clustering pattern as that of the first and/or second aspects.

In either of the first and second aspects, the re-use scheme may be varied, for example in response to actual or predicted demand.

According to a third aspect of the present invention, different re-use schemes such as cell, cluster and cluster group re-use schemes are overlaid on the same set of cells, and different carrier pools are allocated to each re-use scheme.

The available carriers may be divided into pools allocated to the different re-use schemes according to predicted demand. Carriers may be allocated to the cellular re-use pool so as to satisfy a component of the demand which is spatially constant over the cells. Carriers may be allocated to the cluster re-use pool so as to satisfy the demand in excess of the spatially constant component. Carriers may be allocated under a cluster group re-use scheme so as to satisfy peak demand.

A borrowing scheme may also be devised so as to determine the priority with which carriers may be borrowed between pools, and optionally between cells, clusters and cluster groups.

The scope of the present invention extends to methods, apparatus, systems, signals, data structures and programs for any of the following, where applicable:

determining the re-use scheme;
varying the re-use scheme;
assigning carriers according to the re-use scheme; and
performing communications using carriers allocated according to the re-use scheme.

The steps may be performed by any or any combination of one or more satellites, earth stations, network coordination stations, network operation centres, terrestrial cellular base stations, switching centres or separate facilities connected or connectable to any of these.

BRIEF DESCRIPTION OF THE DRAWINGS

Specific embodiments of the present invention will now be described with reference to the accompanying drawings, in which.

Cluster Re-Use Scheme

Figure 3:
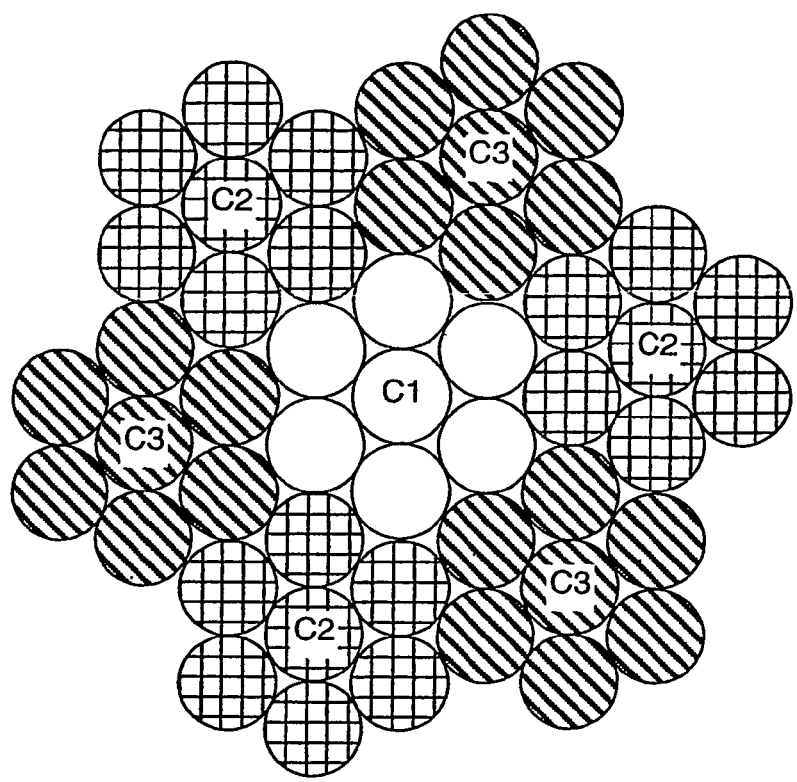
FIG. 3 shows a cluster re-use pattern in a first embodiment of the present invention.

The first embodiment will now be described with reference to FIGS. 3 to 5. In this embodiment, each cell is assigned to one cluster, and each cluster is assigned to one of a plurality of cluster types C1, C2 and C3. As shown in FIG. 3, cluster type C1 comprises one cluster and cluster types C2 and C3 each comprise three non-adjacent clusters.

Figure 4:
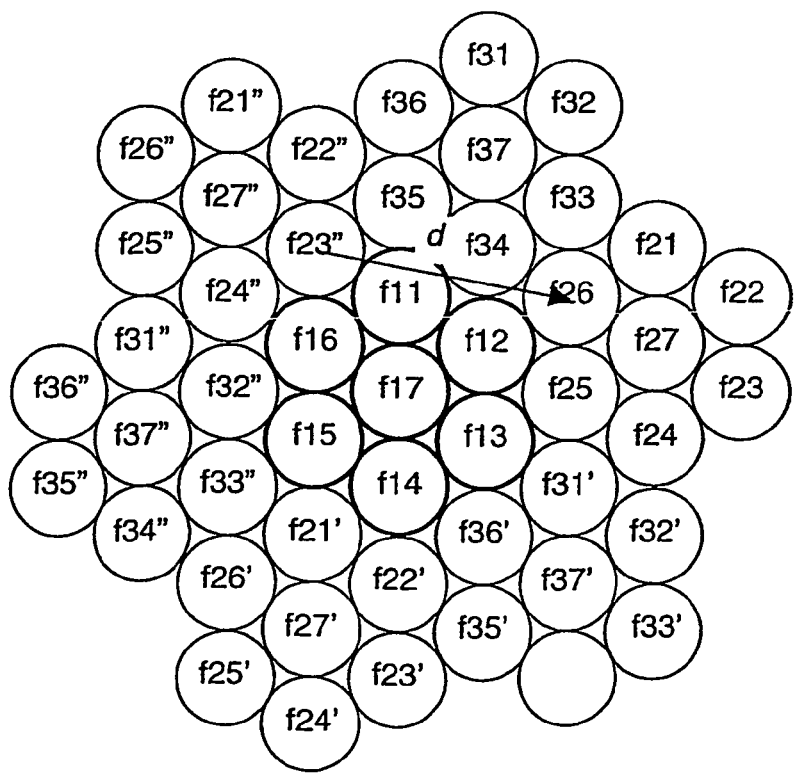
FIG. 4 shows a carrier allocation pattern in the first embodiment.
Figure 5:
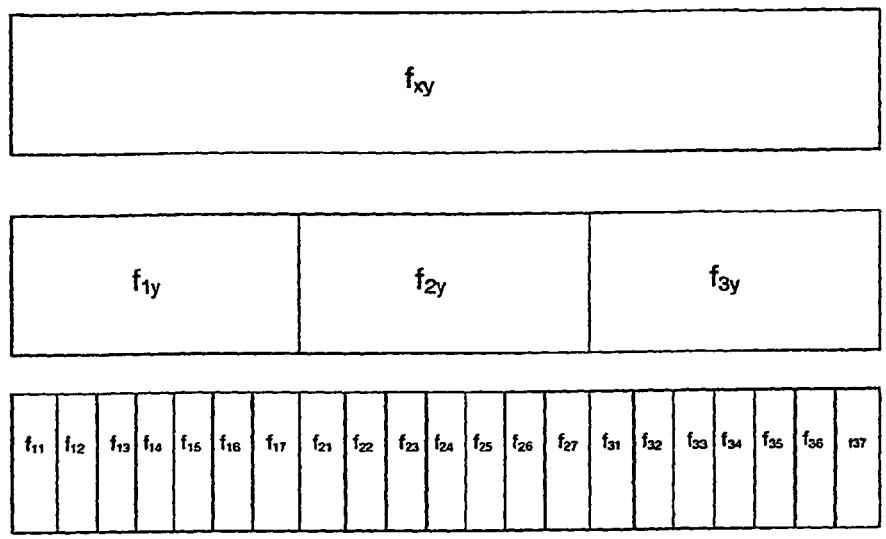
FIG. 5 shows the partitioning of carrier subsets in the first embodiment.
Figure 6:
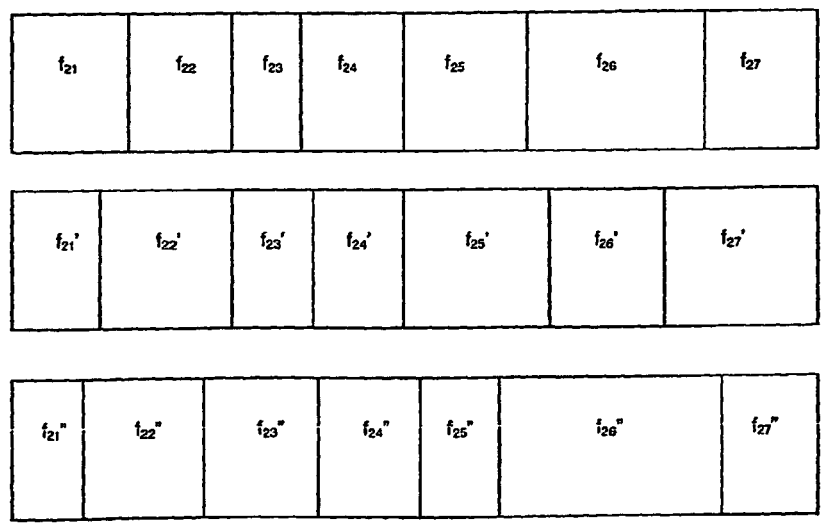
FIG. 6 shows different partitioning of carrier subsets between different clusters of the same type in the first embodiment.

The allocation of the available frequency spectrum to clusters and cells within clusters is illustrated in FIGS. 4 to 6. The available frequency spectrum $f_{xy}$ is subdivided into three frequency bands f1y, f2y and f3y, each of which is assigned to a corresponding cluster type C1, C2 and C3. Each frequency band may be divided into seven frequency blocks which are allocated respectively to the seven cells within a cluster, or the frequencies may be assigned dynamically within the cluster according to demand.

As shown in FIG. 5, frequency band $f_{1y}$ may be divided into frequency blocks $f_{11}$, $f_{12}$, $f_{13}$, $f_{14}$, $f_{15}$, $f_{16}$ and $f_{17}$, frequency band $f_{2y}$ is divided into frequency blocks $f_{21}$, $f_{22}$, $f_{23}$, $f_{24}$, $f_{25}$, $f_{26}$ and $f_{27}$, and frequency block $f_{3y}$ is divided into frequency blocks $f_{31}$, $f_{32}$, $f_{33}$, $f_{34}$, $f_{35}$, $f_{36}$ and $f_{37}$. However, the same partition of frequency blocks does not need to be applied to all of the clusters of a cluster type, because these clusters are separated by at least one intervening cluster that belongs to a different cluster type and therefore has a different frequency band assigned to it.

Figure 1:
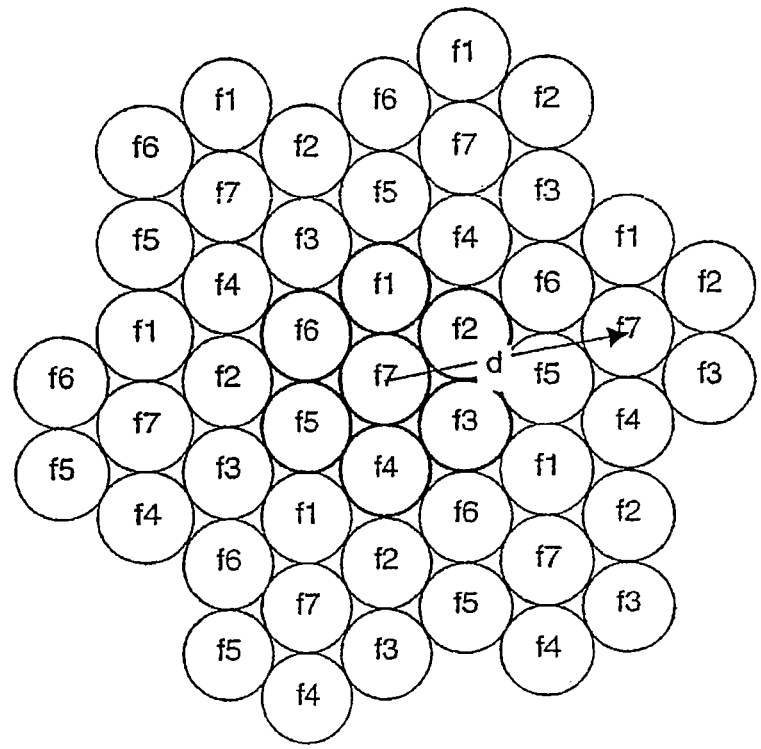
FIG. 1 shows an example of a cellular re-use pattern.
Figure 2:
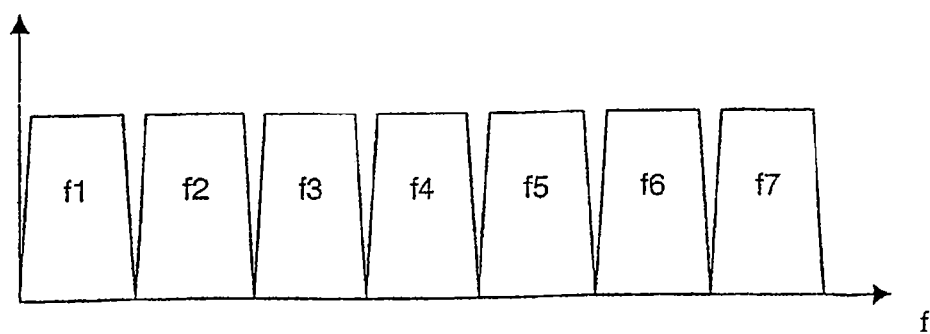
FIG. 2 shows the frequency band partitioning of the re-use pattern.

As shown in FIG. 4, the minimum re-use distance d between two clusters in the same group is the same as the minimum re-use distance between clusters in the prior art example shown in FIG. 2. Hence, the partitioning of each cluster of a cluster type may be determined independently of the partitioning of any other cluster of the same cluster type.

For example, FIG. 6 shows three different partition schemes of the frequency band $f_{2y}$ applied respectively to three clusters within the cluster group C2, as shown in FIG. 4. In the first partition scheme, the frequency band $f_{2y}$ is divided into frequency blocks $f_{21}$, $f_{22}$, $f_{23}$, $f_{24}$, $f_{25}$, $f_{26}$ and $f_{27}$. In the second partition scheme, the frequency band $f_{2y}$ is divided into frequency blocks $f_{21}'$, $f_{22}'$, $f_{23}'$, $f_{24}'$, $f_{25}'$, $f_{26}'$ and $f_{27}'$. In the third partition scheme, the frequency band $f_{2y}$ is divided into frequency blocks $f_{21}''$, $f_{22}''$, $f_{23}''$, $f_{24}''$, $f_{25}''$, $f_{26}''$ and $f_{27}''$. Likewise, three different partition schemes may be applied to the frequency band f3y allocated to cluster group C3, as shown in FIG. 4. In the first partition scheme, the frequency band $f_{3x}$ is divided into frequency blocks $f_{31}$, $f_{32}$, $f_{33}$, $f_{34}$, $f_{35}$, $f_{36}$ and $f_{37}$. In the second partition scheme, the frequency band $f_{3y}$ is divided into frequency blocks $f_{31}'$, $f_{32}'$, $f_{33}'$, $f_{34}'$, $f_{35}'$, $f_{36}'$ and $f_{37}'$. In the third partition scheme, the frequency band $f_{3y}$ is divided into frequency blocks $f_{31}''$, $f_{32}''$, $f_{33}''$, $f_{34}''$, $f_{35}''$, $f_{36}''$ and $f_{37}''$.

The re-use factor of the first embodiment is $\frac{1}{21}$, which is lower than that of the conventional cellular re-use arrangement, but allows greater flexibility in the partition of a frequency band within each cluster and is therefore more suited to asymmetric allocation of frequencies within a cell pattern.

The frequencies allocated to each cluster may be allocated within the cluster according to one of the following schemes:

1) A fixed scheme in which the allocation of frequencies to the cluster is divided statically among the cells.
2) A shared scheme in which the allocation of frequencies to the cluster can be allocated to the individual cells within the cluster dynamically according to demand within the cells. The shared scheme may be fully dynamic where the allocation to individual cells is determined entirely in response to actual demand, or partially dynamic in which a predetermined priority ranking is applied to the allocation of the frequencies to individual cells, and a frequency is selected for assignment to a communication within a cell based on the priority rankings of the frequencies for that cell.

3) A hybrid scheme in which some of the frequencies allocated to the cluster are allocated to the cells under the fixed scheme and others of the frequencies are allocated under the shared scheme.

It is not essential that the clusters of the first embodiment are all the same shape and size, and contain the same number of cells, provided that the minimum re-use distance d is applied to all frequencies.

Cluster Group Re-Use Scheme

Figure 7:
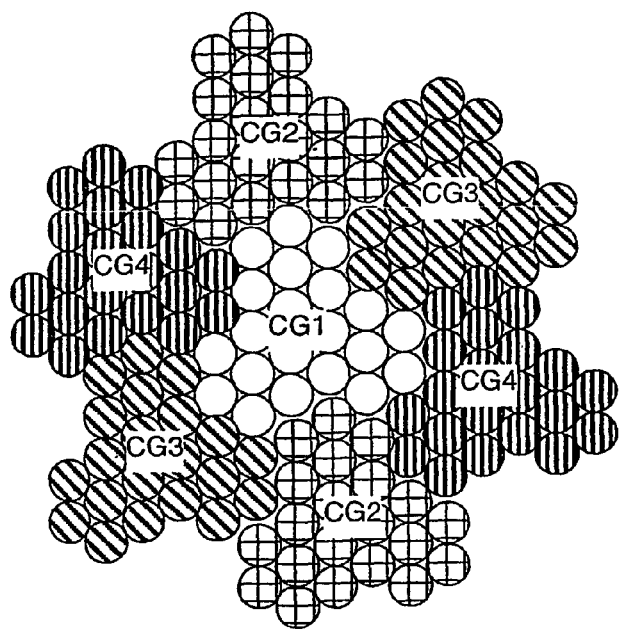
FIG. 7 shows a cluster group re-use pattern in a second embodiment of the present invention.
Figure 8:
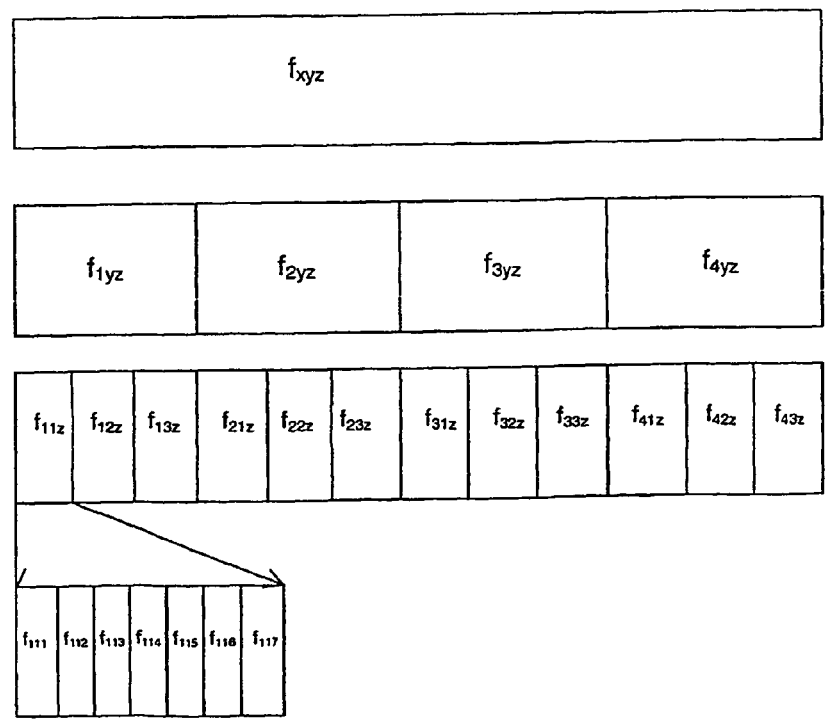
FIG. 8 shows the partitioning of carrier subsets in the second embodiment.

A second embodiment will now be described with reference to FIGS. 7 and 8. In this embodiment, the available spectrum $f_{xyz}$ is subdivided into four bands $f_{1yz}$, $f_{2yz}$, $f_{3yz}$, $f_{4yz}$, each of which is allocated to a respective cluster group type CG1, CG2, CG3, CG4, arranged as shown in FIG. 7. Each cluster group comprises three cell clusters, to each of which is allocated a respective sub-band—for example, band $f_{1yz}$ is divided into subbands $f_{11z}$, $f_{12z}$, and $f_{13z}$. Within each cluster, the allocated subband may be divided into seven blocks which are allocated respectively to the individual cells, or the frequencies may be assigned dynamically within the cluster according to demand. For example, subband $f_{11z}$ is divided into frequency blocks $f_{111}$, $f_{112}$, $f_{113}$, $f_{114}$, $f_{115}$, $f_{116}$, and f117. The same band is allocated to each cluster group of the same cluster group type, but the partition of each band into sub-bands may be varied for each cluster group independently of the other cluster groups of the same type. Hence, the re-use factor is 1/84. The re-use factor can be increased to 3/84 in this example, by re-using frequencies within each cluster group using a cell re-use scheme.

It is not essential that the cluster groups of the second embodiment should all be the same size and shape and have the same number of cells, provided that the minimum re-use distance d is applied to all frequencies.

Furthermore, it is not essential that a set of frequencies that are continuous in frequency must be allocated to a particular cluster group, cluster or cell, subject to the physical limitations of the transceivers to which the frequencies are allocated.

The frequencies allocated to each cluster group may be allocated within the cluster group according to one of the following schemes:

1) A fixed scheme in which the allocation of frequencies to the cluster group is divided statically among the clusters or cells within the cluster group.
2) A shared scheme in which the allocation of frequencies to the cluster group can be allocated to the individual cells or clusters within the cluster group dynamically according to demand. The shared scheme may be fully dynamic where the allocation to individual cells or clusters is determined entirely in response to actual demand, or partially dynamic in which a predetermined priority ranking is applied to the allocation of the frequencies to individual cells or clusters, and a frequency is selected for assignment to a communication within a cell based on the priority rankings of the frequencies for that cell or the relevant cluster.
3) A hybrid scheme in which some of the frequencies allocated to the cluster group are allocated under the fixed scheme and others of the frequencies are allocated under the shared scheme.

Combined Re-Use Schemes

From the above description, it will be appreciated that better frequency re-use is achieved with fewer group types and smaller numbers of cells per group. On the other hand, more group types and more cells per group allows for more asymmetry in frequency allocation across a cell pattern. For example, the conventional cell re-use scheme has one cell per group and seven group types. The cluster re-use scheme has seven cells per group and three group types. The cluster group re-use scheme has twenty-one cells per group and four group types.

A better match between frequency demand and allocation can be achieved by combining different re-use schemes having different re-use factors and asymmetric capabilities. The asymmetry of allocations and the permitted degree of sharing between the cells, clusters and cluster groups depends on the asymmetry of traffic demand. Resource dimensioning is performed primarily to match the traffic demand and secondarily to provide a certain degree of flexibility and sharing according to the predictability of the demand.

Figure 9:
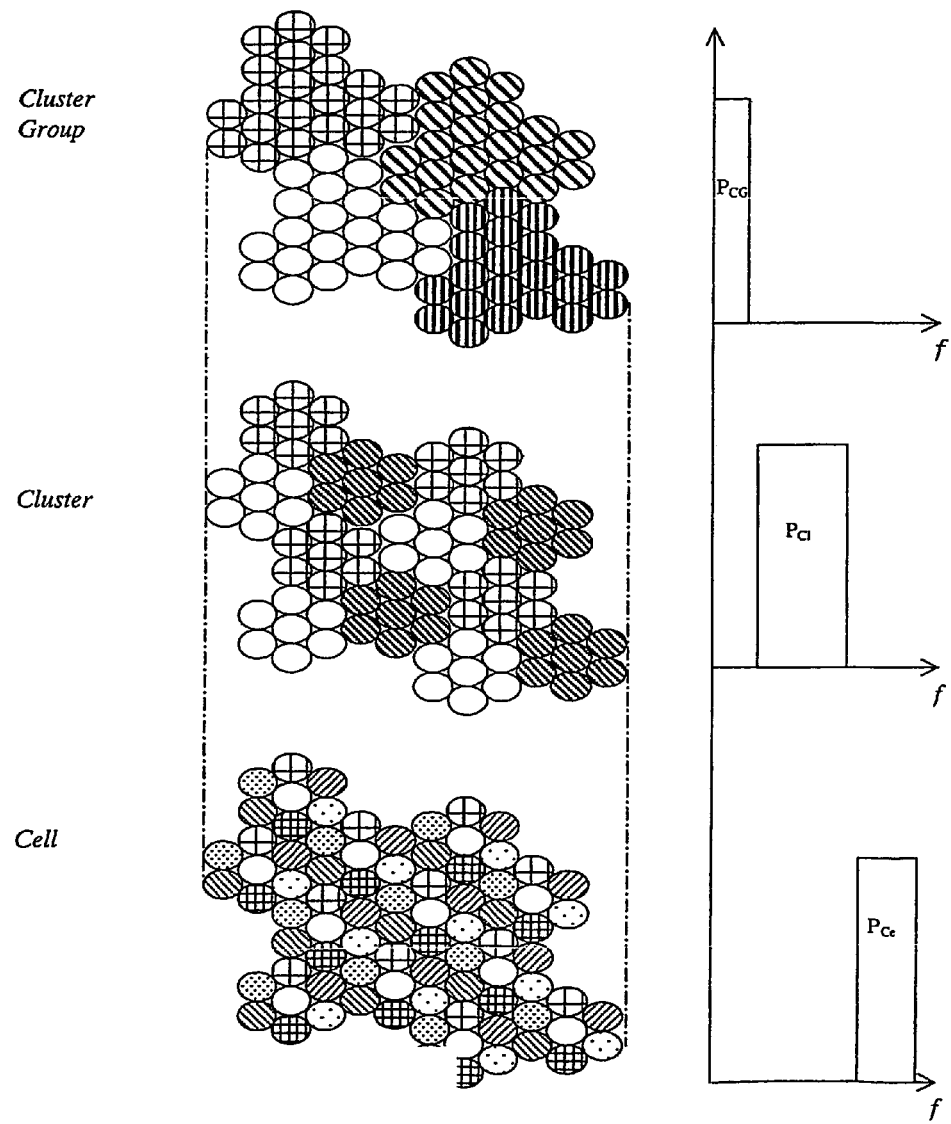
FIG. 9 illustrates a combined re-use scheme in which a cellular re-use scheme, a cluster re-use scheme according to the first embodiment and a cluster group re-use scheme according to the second embodiment are overlaid on the same set of cells and different pools of carriers are allocated to each.

For example, as shown in FIG. 9, the available spectrum may be divided into three frequency pools: a cell pool $P_{Ce}$ allocated under the cell re-use scheme, a cluster pool $P_{Cl}$ allocated under the cluster re-use scheme, and a cluster group pool $P_{CG}$ allocated under the cluster group re-use scheme. For a given cell pattern, separate cell, cluster and cluster group re-use schemes are defined and the respective pools are allocated under each scheme.

Alternatively or additionally, different re-use schemes may be applied to different cells within a cell pattern; for example, in an area of symmetric demand between different clusters, a cell re-use pattern is applied, while in areas of highly asymmetric demand, a cluster group re-use pattern is applied, while observing the minimum re-use distance rule both within a re-use scheme and between re-use schemes. The number of cells per cluster or cluster group may vary across the beam pattern, so long as the minimum reuse distance is observed for any given frequency.

Figure 10:
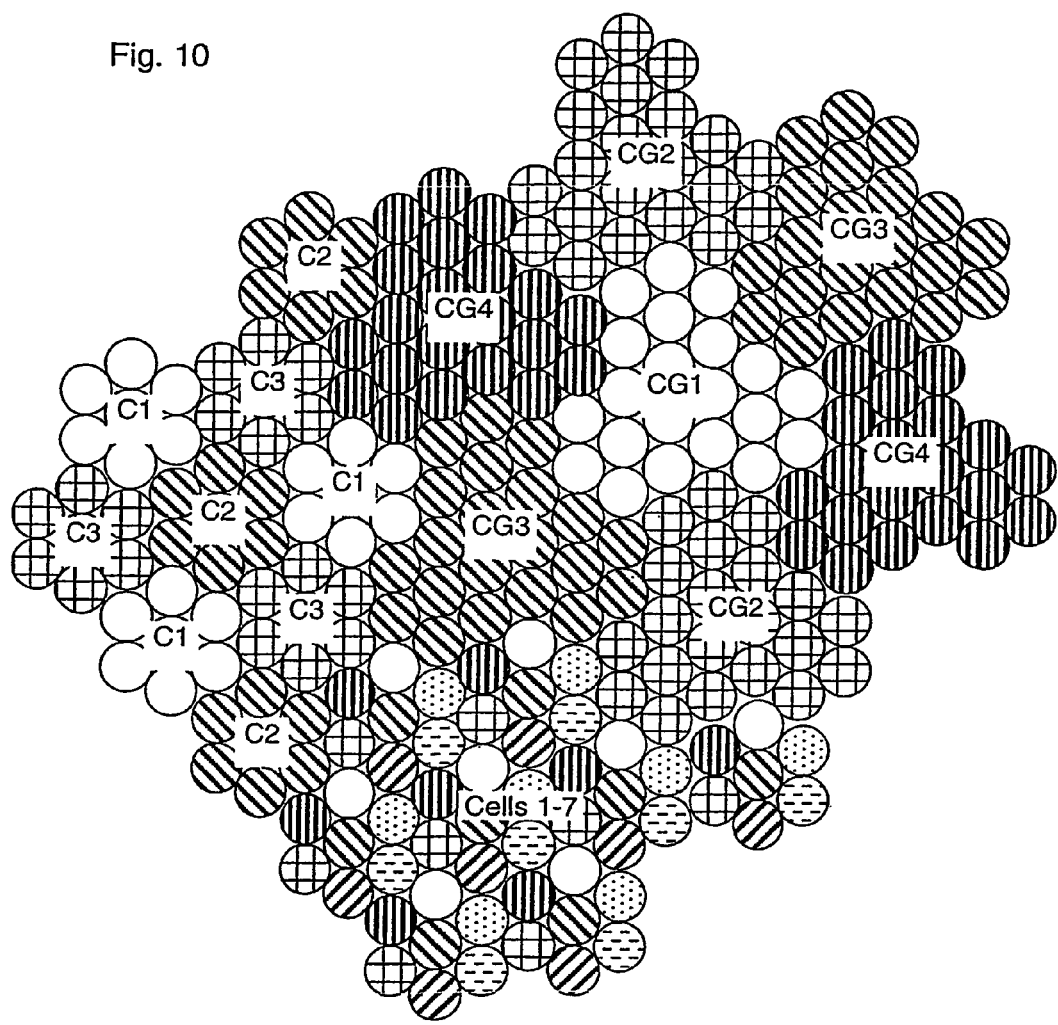
FIG. 10 illustrates a combined re-use scheme in which a cellular re-use scheme, a cluster re-use scheme and a cluster group re-use scheme are used with different cells of the same cell pattern.

For example, as shown in FIG. 10, part of a beam pattern is allocated under a cluster group re-use scheme with cluster groups CG1 to CG4, another part is allocated under a cluster reuse scheme with clusters C1 to C3, and another part is allocated under a cell reuse scheme with cells 1-7. In FIG. 10, the same shading is used for some of the cells in different schemes. Cells with the same shading under different re-use schemes may have some frequencies allocated in common, although not necessarily all. The shading illustrates how the minimum re-use distance may be observed between neighbouring different allocation schemes.

Different combined neighbouring re-use schemes may be overlaid, using different pools of carriers.

Figure 11:
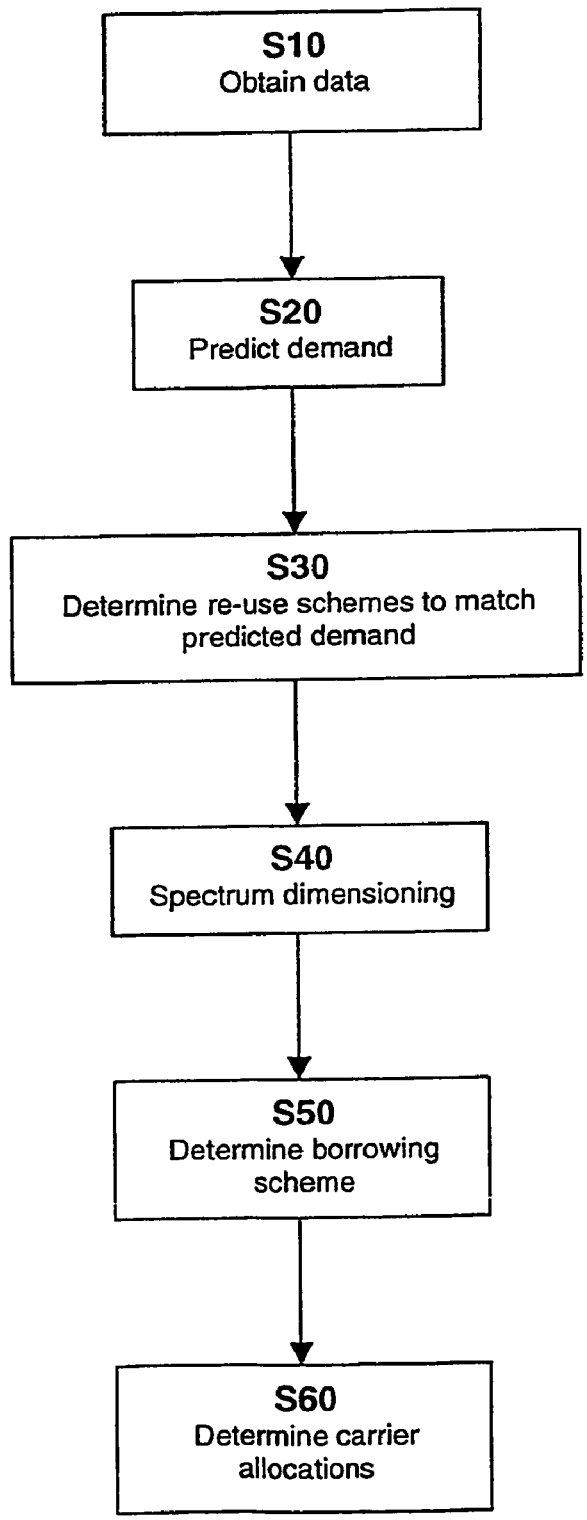
FIG. 11 is a flowchart of a generic allocation method which can be applied to embodiments of the present invention.

A generic allocation method is shown in the flowchart of FIG. 11. At step S10, historical and other data are obtained. At step S20, the carrier demands for each cell during the allocation period are predicted from the data obtained. At step S30, a combination of the cell, cluster and cluster group re-use schemes is found which matches the predicted carrier demands per cell with the greatest efficiency, subject to any additional restrictions, such as regulatory restrictions of the use of specified frequencies in specified area and restrictions on the number of carriers which can be used in each cell. At step S40, the available spectrum is divided among the re-use schemes according to their requirements. At step S50, a borrowing scheme is determined so as to regulate how carriers are to be borrowed under a dynamic allocation scheme. At step S60, specific carriers are allocated to each cell, cluster and cluster group according to the re-use schemes and the spectrum dimensioning.

The process may be repeated for each successive allocation period. The length of the allocation periods may vary and may depend on the daily or weekly variation of demand. For example, different allocation schemes may be defined for an off-peak period and a peak period of each day. In any specific system, the flexibility of having frequently changing allocation schemes must be balanced with the inefficiency and complexity of the process involved in handing over between successive schemes.

Specific Allocation Method

Figure 12:
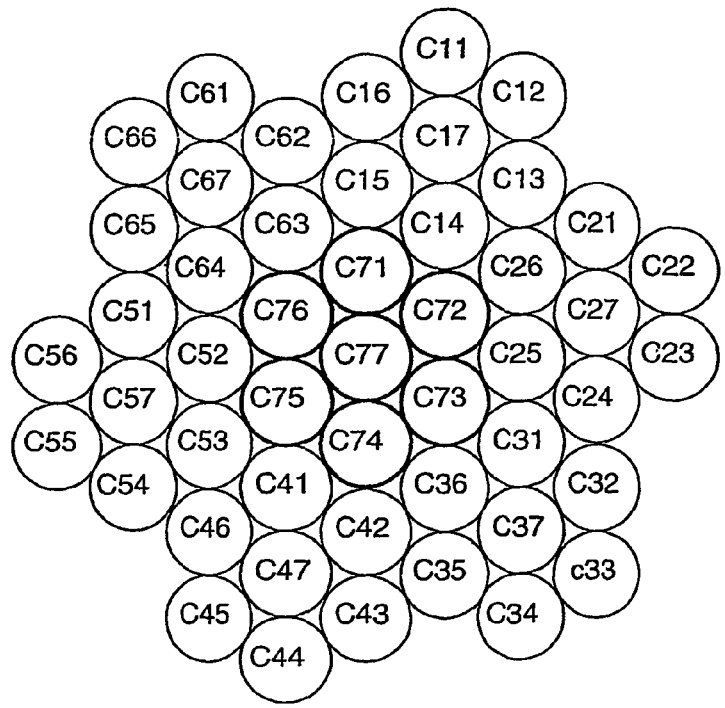
FIG. 12 is a diagram of a cell pattern with cells references by cluster and cell number.
Figure 13:
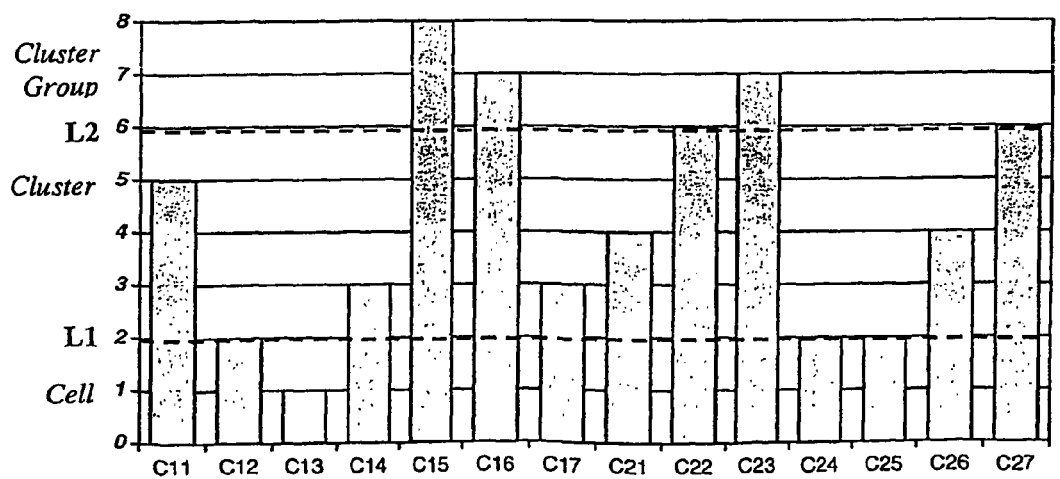
FIG. 13 is a chart illustrating a predicted demand for a selection of cells, and levels used to determine the allocation of carriers under different re-use schemes.

A specific example of the allocation method will now be described with reference to FIGS. 12 and 13. In this example, the available carriers are divided into a cell re-use pool, a cluster re-use pool and a cluster group re-use pool, as described above. As shown in FIG. 12, a cell pattern is divided into clusters, and each cell is identified by the reference Ccn, where:

c=cluster number
n=cell number within cluster

At step S10, historical data is accessed from records of the average number of carriers in use for each cell and for each unit of time. User distribution data, showing the current number of users registered in each cell, may be obtained from mobility management databases. Fixed or scheduled demand data, indicating capacity demands that have been leased or reserved at specified times, may also be obtained.

At step S20, the predicted demand is calculated for each cell based on the data obtained and the allocation period. For example, the historical fluctuation of demand in each cell may be determined as a function of time of day, day of the week, season, and the occurrence of a festival or holiday period applicable to the coverage area of that cell, and the demand may then be extrapolated for the current allocation period. One or more predictability factors may also be calculated for each cell, indicating the confidence level of the predicted demand. Hence, where the fluctuation of demand contains a large apparently random component which is not a function of any of the parameters identified above, the predictability factor is low. Conversely, where the fluctuation of demand is strongly dependent on one or more of these parameters, the predictability factor is high. An example of predicted demand for a selection of the cells is shown in FIG. 13.

A weighting factor is calculated for each cell, for use in determining the allocation priority between different cells. The weighting factor is calculated as a function of some or all of the following factors:

predicted load per cell
predictability factor of the load
density of users per cell At step S30, a minimum traffic loading level L1 is determined, to represent substantially the minimum cell loading level (in this case L1=2). A corresponding number of carriers is allocated in each cell of the cell pattern under the cell re-use scheme: The level L1 represents the substantially symmetrical component of the traffic loading. In one example, the minimum loading per cell is taken for each cluster, an average is taken for all the clusters, and the average is rounded up to give L1.

A static maximum traffic loading level L2 is then determined for each cluster type, and the total predicted load between the levels L1 and L2 is calculated for each cluster of the cluster type. For example, in cluster 1 this total is 3+1+4+4+1=13. The maximum total predicted load required by any of the clusters of that cluster type is then calculated, and a number of carriers sufficient to satisfy this maximum total predicted load is then allocated to each cluster of that cluster type under the cluster re-use scheme.

The cluster allocation may consist of a fixed allocation per cell, a shared allocation among the cells of the cluster or a hybrid allocation between the cells and the cluster. The degree of sharing is dependent on the profile and predictability of the demand.

The peak traffic loading levels, above the level L2, are allocated carriers under the cluster group re-use scheme, and the boundaries between cluster groups are defined so as to maximize the carrier usage efficiency, taking into account the time of peak usage in each cell. For example, FIG. 13 shows that peak traffic loading levels exist in cells C15 and C16. If these peaks occur substantially simultaneously, three carriers will need to be allocated to satisfy this demand. However, if the peaks are not simultaneous, only two carriers need be allocated and may be shared between the associated cells. This sharing may be prioritised according to a priority ranking for each cell. The priority ranking is determined by the predicted load level in each cell weighted by the weighting factor of that cell.

Other kinds of fixed, sharing or hybrid schemes as described above may be used in this case.

If peak traffic loading levels occur in different cells separated by at least the minimum re-use distance, these cells are preferably placed within the same cluster group or cluster group type so that carriers can be re-used between the two peaks.

The levels L1 and L2 may be varied iteratively to match the predicted demand as closely as possible while maximizing the re-use efficiency.

At step S40, the available frequency spectrum is partitioned between the cell, cluster and cluster group re-use schemes according to the number of carriers required under each scheme for each cell, cluster and cluster group respectively, and subject to limitations imposed by the specific system. For example, it may be advantageous in certain systems to allocate a continuous block of spectrum containing a number of frequency channels to the same cell. This technique assists block down-conversion, and may be required in satellite systems where each satellite transponder, which transponds a continuous block of channels, can be assigned to only one beam at any one time.

At step S50, a borrowing scheme is devised to determine the borrowing priority between the cell, cluster and cluster group pools. This priority may be based on the relative predicted excess capacity or 'cushion' in each of the cell, cluster and cluster group pools. For example, a borrowing matrix may be defined as shown below in Table 1:

TABLE 1

Borrowing Matrix

| From | To | | |
|---|---|---|---|
| | Cells | Clusters | Cluster Groups |
| Cells | 2 | 1 | 0 |
| Clusters | 1 | 0 | 2 |
| Cluster Groups | 2 | 1 | 2 |

Borrowing occurs preferably where indicated by priority 2, less preferably by priority 1 and not at all at priority 0. Each of the categories of cells, clusters and cluster groups may be subdivided into individual cells, clusters and groups so as to give a priority for borrowing between any specific cell, cluster and cluster group.

If no channels can be borrowed under the borrowing scheme described above, any available channel can be borrowed subject to the minimum re-use distance rule.

Assignment of Carriers

The allocation plan is communicated to a network entity or entities which receive requests for carriers for communication with terminals or other equipment such as gateways, assign specific carriers in response to those requests, and update records of which carriers are currently assigned. The assigned carrier(s) may comprise one or more forward carriers and/or one or more return carriers, depending on the type of service requested. The functions performed by such network entities are shown in outline in the flowchart of FIG. 14.

At step S70, the network entity receives the allocation plan for the relevant period; if the network entity is responsible for assignment of only part of the allocation plan, only that part may be received. At the commencement of the relevant period, the allocation plan is marked as current. If required, a handover from the previous allocation plan is implemented.

Steps S80 to S110 are repeated during the current allocation period and may be run concurrently with other instances of these steps to handle multiple concurrent requests.

At step S80 the network entity receives an assignment request. The request may be received from a terminal within the network, or may be generated by a call or session initiated from another network to a terminal within the network. At step S90, the network entity determines the cell location of the terminal within the network. At step S100, the network entity determines whether a carrier or carriers are available and suitable for fulfilling the assignment request, either according to the allocation plan or the borrowing scheme. If so, the carrier or carriers are assigned at step S110 and the carriers are flagged as assigned at step S110. The assignment may involve sending an assignment signal indicating the assigned carrier or carriers to the terminal within the network. If no suitable carriers are available, a blocking condition is signalled to the requesting party. In either case, a record is made of the assignment or blocking for use in generating historical usage records.

Figure 14:
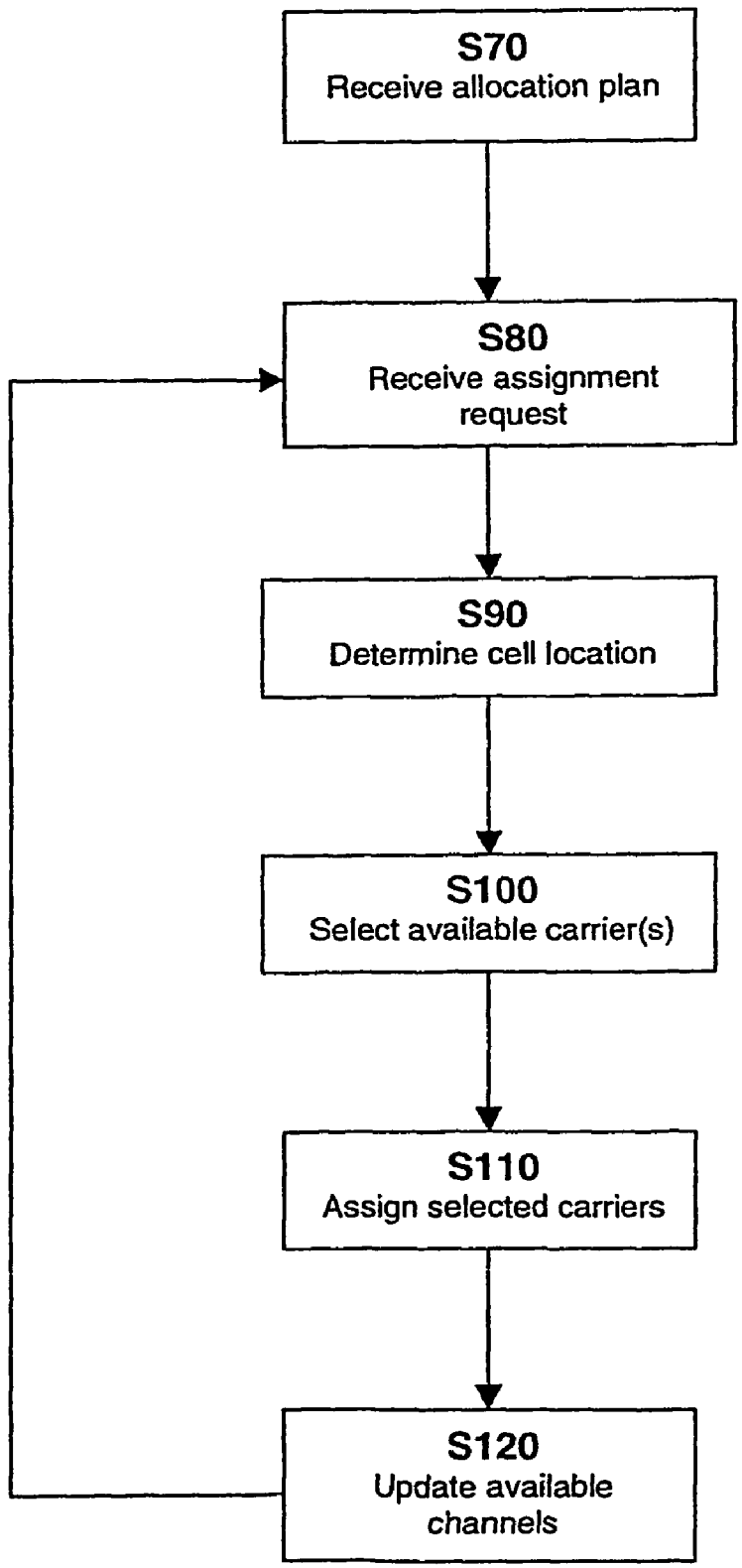
FIG. 14 is a flowchart showing an assignment process using an allocation plan in an embodiment of the invention.

Although not shown in the flowchart of FIG. 14, the network entity may also receive a carrier release message from the terminal within the network when the carrier is no longer required, or may detect that the assigned carriers are no longer in use. In either case, the carriers are flagged as available once more and a record made of the carrier release for use in generating the historical usage records.

Geostationary Satellite System

A specific application of the above embodiments to a geostationary satellite system will now be described with reference to FIGS. 15 to 19.

Figure 15:
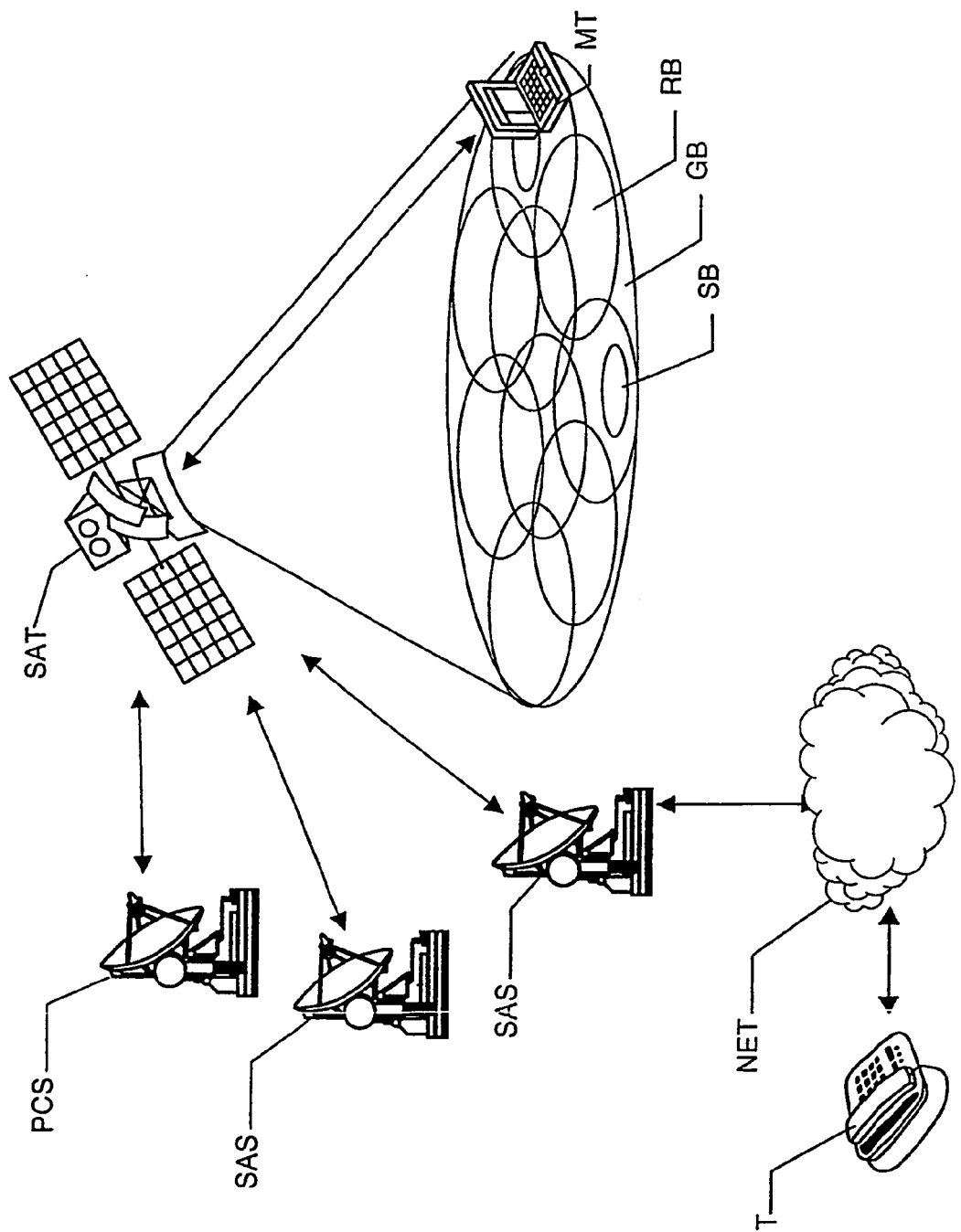
FIG. 15 shows a geostationary satellite system within which embodiments of the invention may be implemented.

FIG. 15 shows schematically a geostationary satellite communication system including one or more satellite access stations (SAS) which act as gateways to other communications networks NET for communication with any of a large number of network terminals NT. Each SAS is able to communicate with a plurality of mobile terminals (MT) using radio frequency (RF) channels retransmitted by one or more geostationary satellites SAT.

The satellite SAT includes a beam forming network, receive antenna and transmit antenna (not shown) which generate substantially congruent receive and transmit beam patterns. Each beam pattern consists of a global beam GB, a small number of overlapping regional beams RB which are narrower than, and fall substantially within, the global beam and a large number of spot beams SB (only two of which are shown in FIG. 15, for clarity) which are narrower than the regional beams and may fall either within or outside the regional beams, but fall substantially within the global beam. Each spot beam may or may not overlap another spot beam, and at least some of the spot beams are steerable so that their area of coverage on the earth's surface can be changed.

The satellite includes a transponder which maps each C-band frequency channel received in a feeder link onto a corresponding L-band frequency channel transmitted in a specified beam in a user link, and maps each L-band frequency channel received in each beam in the user link onto a corresponding frequency channel in the feeder link. The mapping of frequency channels to beams can be varied under the control of a payload control station (PCS), which also controls the mapping of L-band channels in the user link to C-band channels in the feeder link. The satellite SAT acts as a 'bent pipe' and does not demodulate or modify the format of the signals within each frequency channel.

Figure 16:
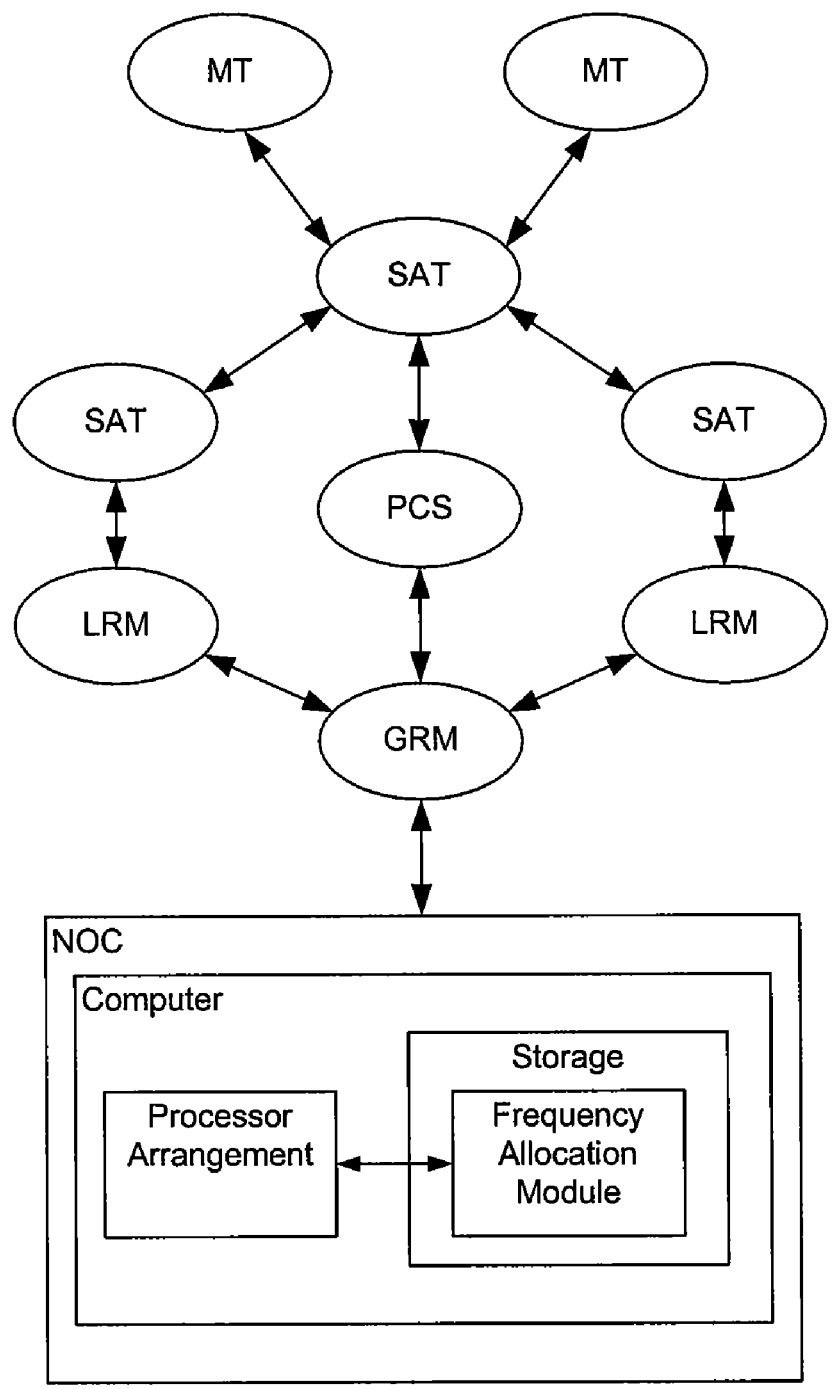
FIG. 16 is a diagram of the architecture of a frequency planning part of the geostationary satellite system.

The architecture of the frequency allocation system of the satellite system is shown in FIG. 16. A network operations centre (NOC) determines the current re-use scheme and the resultant frequency allocation plan. For each satellite SAT, a global resource manager (GRM) receives the frequency allocation plan for that satellite The GRM controls the PCS to implement the allocation scheme on the satellite, for example by configuring the satellite transponders to assign the specified frequency channels to the allocated beams. For each SAS, a local resource manager (LRM) receives a subset of the frequency allocation plan representing frequencies pre-allocated to that SAS and records the channel assignments made by the SAS, together with associated usage data.

The GRM receives the usage data from the LRMs. The usage data includes traffic reports over periods varying from one hour to three months, to reflect variations dependent on time of day, day of the week, holiday periods and seasons, for example. The information may report, for each beam, on the quantity, type, duration, Quality of Service and/or data volume of calls or sessions. Additionally, the reports may include statistics on dropped calls or sessions, congestion or blocking incidents and overall service availability. The reports are sent to the NOC and are used as input for future frequency plans.

The NOC generates a new frequency plan hourly, daily or monthly, as needed, and different schemes or parts of schemes of the frequency plan may be updated at different rates. For example, the cell re-use scheme may be updated relatively infrequently, for example monthly, as the symmetrical component of the carrier demand does not change rapidly. The cluster re-use scheme may be updated more frequently, while the cluster group re-use scheme may be updated frequently, for example hourly, to reflect short-term asymmetries across the cell pattern. Within a particular scheme, the partition of the carriers within a group or between different groups may be varied, and/or the allocation of cells to groups may be varied. Multiple frequency plans may be generated by the NOC and distributed via the GRM, each tagged with a start time and date indicating when that frequency plan is to be applied.

Each of the elements of the frequency allocation scheme may comprise one or more computers running computer programs, together with communications interfaces to other elements to which they are connected; some of the elements may be combined within the same one or more computers.

Figure 17:
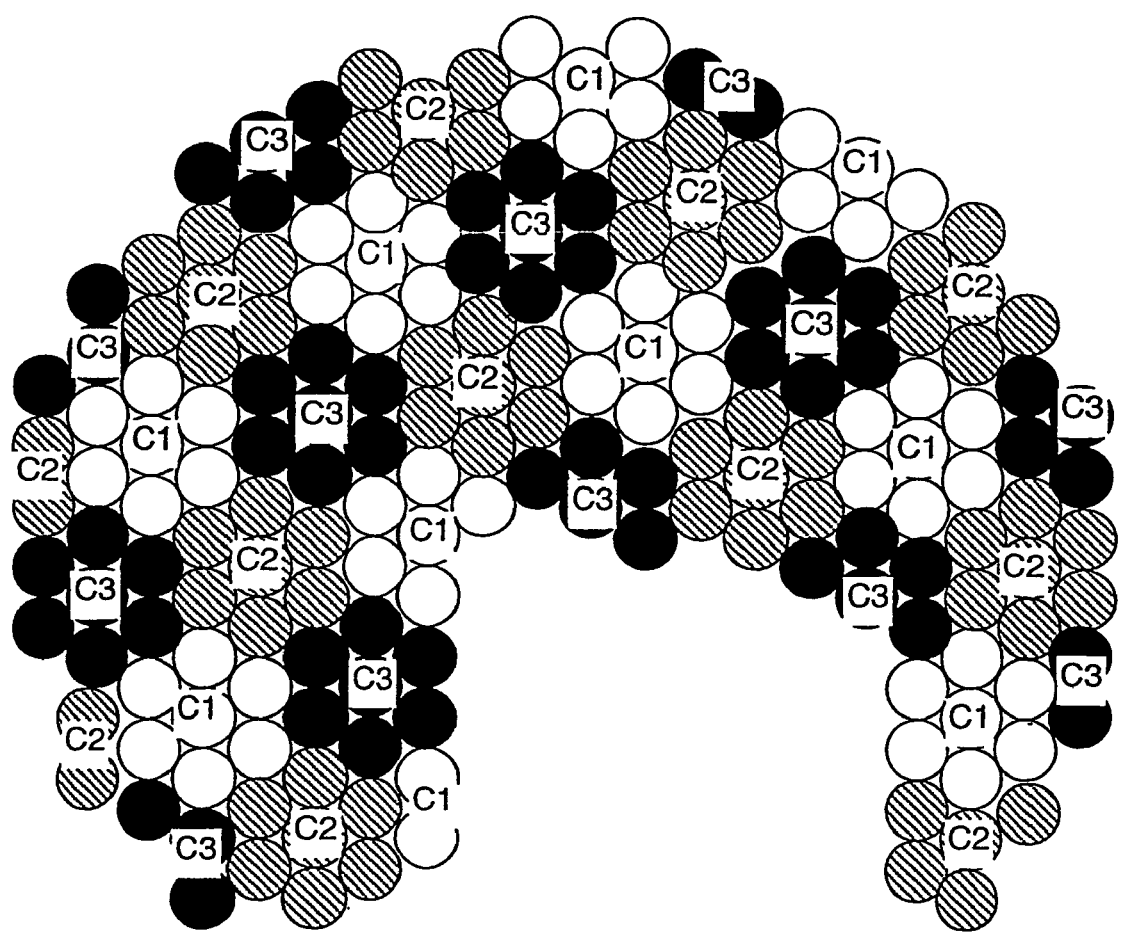
FIG. 17 shows a cluster re-use pattern according to the first embodiment applied to the beam pattern of the geostationary satellite system.

An example of the cluster re-use scheme applied to the spot beam pattern of the geostationary satellite system is shown in FIG. 17. The spot beam pattern is designed to cover the terrestrial and coastal areas of the coverage area of the satellite, and hence does not completely fill the coverage area. The areas not covered by the spot beams may be serviced by the regional beams or the global beam.

Figure 18:
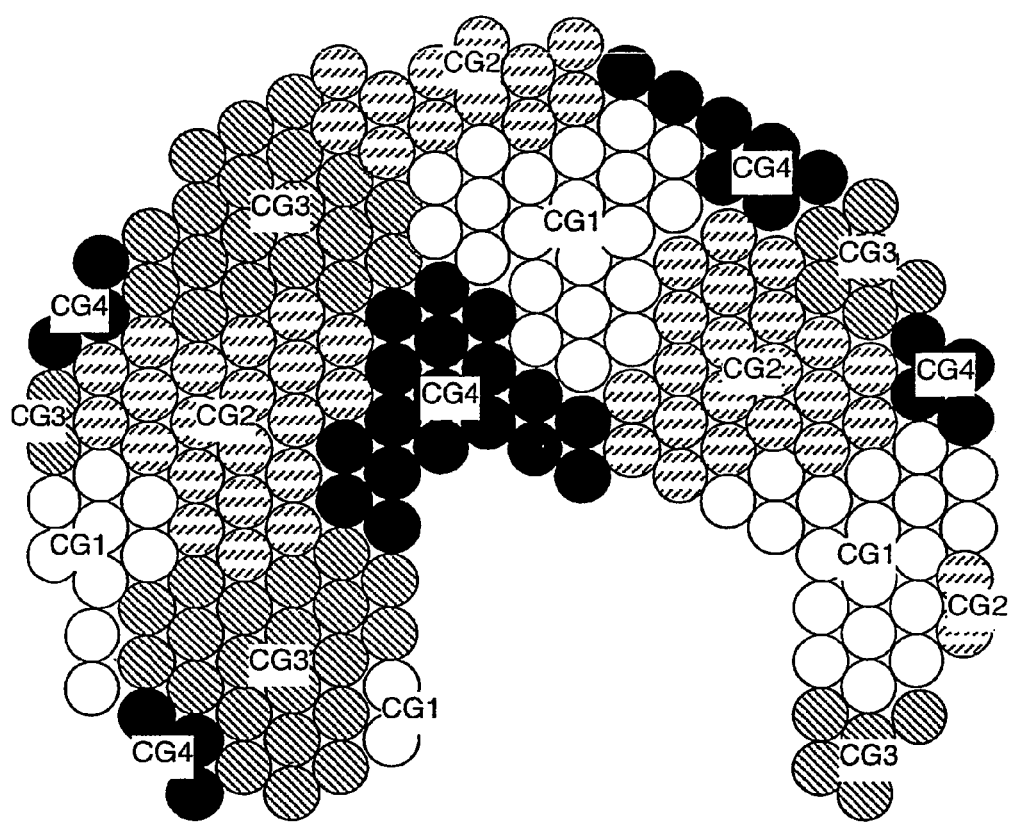
FIG. 18 shows a first example of a cluster group re-use pattern according to the second embodiment applied to the beam pattern of the geostationary satellite system.
Figure 19:
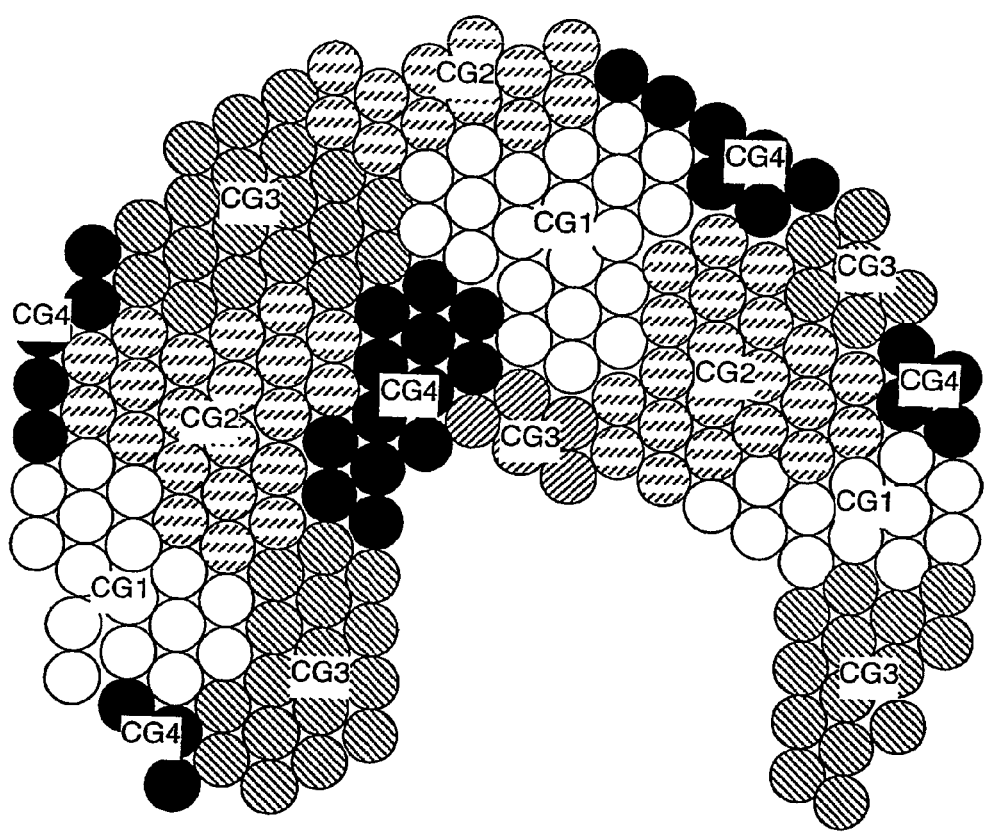
FIG. 19 shows a second example of a cluster group re-use pattern according to the second embodiment applied to the beam pattern of the geostationary satellite system.

A first example of the cluster group re-use scheme applied to the spot beam pattern of the geostationary satellite system is shown in FIG. 18, while a second example of the cluster group re-use scheme applied to the spot beam pattern is shown in FIG. 19, in which the cluster group type allocations of selected beams have been modified whilst keeping the cluster group allocation of others the same. It is apparent from FIGS. 18 and 19 that there is great flexibility in the size and relative positioning of the cluster group types, while still observing the minimum re-use distance rule.

Alternative Applications

Embodiments of the present invention may be applied to other geostationary or geosynchronous satellite systems in which the allocation and assignment steps are carried out using a different architecture, for example by processing means within the satellite. Embodiments may also be applied to non-geosynchronous satellite systems, for example earth-fixed satellite cellular systems in which the frequency allocation is performed with reference to a notional cellular structure defined with reference to the earth's surface rather than to the satellite beams. Embodiments may also be applied to terrestrial cellular systems.

The invention claimed is:

1. A method of allocating a plurality of carriers to a plurality of cells in a wireless cellular communications system, the method comprising:
dividing, at a network operations centre, the cells into a plurality of groups each comprising a contiguous plurality of said cells, each group having one of a plurality of group types, such that groups of the same group type are separated by at least a predetermined minimum re-use distance;
dividing, at the network operations centre, the carriers into a plurality of carrier sets corresponding respectively to the plurality of group types; and
allocating, at the network operations centre, the carriers from each carrier set to the corresponding group type, such that at least some of the carriers are each allocated to more than one of the groups of said plurality of groups, the groups of said more than one of the groups being of the same group type, none of said carriers is allocated to a plurality of cells mutually separated by less than said predetermined minimum re-use distance within the same group, and such that the allocation of said carriers among the cells of a first of the groups of said plurality of groups differs from the allocation of said carriers among the cells of a second of the groups of said plurality of groups, the first and the second of the groups of said plurality of groups being of the same group type.

2. The method of claim 1, wherein, for at least some of the groups of said plurality of groups, at least some of the carriers of the corresponding carrier set are each allocated to a predetermined one of the cells of that group.

3. The method of claim 1, wherein, for at least some of the groups of said plurality of groups, at least some of the carriers of the corresponding carrier set are allocated as available to any of the cells of that group.

4. The method of claim 1 wherein at least some of the carriers are allocated to a plurality of cells mutually separated by at least said predetermined minimum re-use distance within the same group.

5. The method of claim 1, wherein each of the groups of said plurality of groups has the same number and configuration of cells.

6. The method of claim 5, wherein the number of said group types and carrier sets is three.

7. The method of claim 1, wherein at least one of the groups surrounded by other groups comprises a different number of cells from another of said groups surrounded by other groups.

8. The method of claim 7, wherein the number of said group types and carrier sets is four.

9. The method of claim 1, including varying the division of cells into groups as a function of time.

10. The method of claim 1, including varying the division of carriers into carrier sets as a function of time.

11. The method of claim 1, including varying the allocation of carriers among cells within the same group as a function of time.

12. The method of claim 9, wherein the varying step is dependent on previous usage and/or availability of said carriers in said cells.

13. A method of allocating a first and a second plurality of carriers to a plurality of cells, comprising:
allocating, at a network operations centre, said first plurality of carriers to the plurality of cells by a first method, wherein said first method comprises:
dividing, at the network operations centre, the cells into a plurality of first groups each comprising a contiguous plurality of said cells, each first group having the same number and configuration of cells and having one of a plurality of first group types, such that first groups of the same type are separated by at least a predetermined minimum re-use distance,
dividing, at the network operations centre, said first plurality of carriers into a plurality of first carrier sets corresponding respectively to the plurality of first group types, and
allocating, at the network operations centre, the carriers from each first carrier set to the corresponding first group type such that at least some of the carriers of the first plurality of carriers are each allocated to a plurality of said first groups of the same first group type, none of said carriers of the first plurality of carriers is allocated to a plurality of cells mutually separated by less than said minimum re-use distance within the same first group, and such that the allocation of said carriers of the first plurality of carriers among the cells of one of said first groups differs from the allocation of said carriers of the first plurality of carriers among the cells of another one of said first groups of the same type; and
allocating, at the network operations centre, said second plurality of carriers to the plurality of cells by a second method, wherein said second method comprises:
dividing, at the network operations centre, the cells into a plurality of second groups each comprising a contiguous plurality of said cells, wherein at least one of said second groups surrounded by other second groups comprises a different number of cells from another of said second groups surrounded by other second groups, each second group having one of a plurality of second group types, such that second groups of the same type are separated by at least a predetermined minimum re-use distance,
dividing, at the network operations centre, said second plurality of carriers into a plurality of second carrier sets corresponding respectively to the plurality of second group types, and allocating, at the network operations centre, the carriers from each second carrier set to the corresponding second group type such that at least some of the carriers of the second plurality of carriers are each allocated to a plurality of said second groups of the same second group type, none of said carriers of the second plurality of carriers is allocated to a plurality of cells mutually separated by less than said minimum re-use distance within the same second group, and such that the allocation of said carriers of the second plurality of carriers among the cells of one of said second groups differs from the allocation of said carriers of the second plurality of carriers among the cells of another one of said second groups of the same type.

14. The method of claim 13, further comprising allocating a further plurality of carriers to said plurality of cells by dividing the cells into a plurality of cell types such that cells of the same type are separated by at least the minimum re-use distance, and dividing the further plurality of carriers into a respective plurality of further carrier sets allocated respectively to said plurality of cell types.

15. A method of allocating a plurality of carriers to a first and a second plurality of cells within the same cellular communication system, comprising:
allocating, at a network operations centre, said plurality of carriers to said first plurality of cells by a first method and allocating said plurality of carriers to said second plurality of cells according to a second method such that none of the carriers is allocated to one of said first plurality of cells and to one of said second plurality of cells separated by less than said minimum re-use distance, wherein said first method comprises:
dividing, at the network operating centre, said first plurality of cells into a plurality of first groups each comprising a contiguous plurality of said first plurality of cells, each first group having the same number and configuration of cells and having one of a plurality of first group types, such that first groups of the same type are separated by at least a predetermined minimum re-use distance,
dividing, at the network operating centre, said carriers into a plurality of carrier sets corresponding respectively to the plurality of first group types, and
allocating, at the network operations centre, the carriers from each carrier set to the corresponding group type such that at least some of the carriers are each allocated to a plurality of said first groups of the same first group type, none of said carriers is allocated to a plurality of cells mutually separated by less than said minimum re-use distance within the same first group, and such that the allocation of said carriers among the cells of one of said first groups differs from the allocation of said carriers among the cells of another one of said first groups of the same type; and
wherein said second method comprises:
dividing, at the network operating centre, said second plurality of cells into a plurality of second groups each comprising a contiguous plurality of said second plurality of cells, wherein at least one of the second groups surrounded by other second groups comprises a different number of cells from another of said second groups surrounded by other second groups, each second group having one of a plurality of second group types, such that second groups of the same type are separated by at least a predetermined minimum re-use distance,
dividing, at the network operating centre, said carriers into a plurality of carrier sets corresponding respectively to the plurality of second group types, and
allocating, at the network operations centre, said carriers from each carrier set to the corresponding group type such that at least some of said carriers are each allocated to a plurality of said second groups of the same second group type, none of said carriers is allocated to a plurality of cells mutually separated by less than said minimum re-use distance within the same second group, and such that the allocation of said carriers among the cells of one of said second groups differs from the allocation of said carriers among the cells of another one of said second groups of the same type.

16. A method of allocating a plurality of carriers to a plurality of cells in a wireless cellular communications system, the method comprising:
determining, at a network operating centre, a first re-use scheme in which the cells are divided into a plurality of first groups, each first group having one of a plurality of first group types, such that first groups of the same type are separated by at least a predetermined minimum reuse distance;
determining, at the network operating centre, a second re-use scheme in which the cells are divided into a plurality of second groups, each second group having one of a plurality of second group types, such that second groups of the same type are separated by at least said minimum re-use distance, wherein the first groups are not coterminous with the second groups;
dividing, at the network operating centre, the plurality of carriers into at least first and second carrier pools; and
allocating, at the network operating centre, the first and second pools respectively under the first and second re-use schemes such that the first pool is divided into a plurality of first carrier sets allocated respectively to the plurality of first group types and the second pool is divided into a plurality of second carrier sets allocated respectively to the plurality of second group types.

17. The method of claim 16, wherein the first groups each comprise a mutually different one of said cells.

18. The method of claim 16, wherein the second groups each comprise a mutually different plurality of said cells.

19. The method of claim 16 wherein the carriers are divided between the first and second carrier pools according to a predicted demand among said cells.

20. The method of claim 16, wherein the carriers are divided between the first and second carrier pools so as to maximize the re-use efficiency of the carriers.

21. A method of allocating a plurality of carriers to a plurality of cells in a wireless cellular communications system, the method comprising:
determining, at a network operating centre, a first re-use scheme in which the cells are divided into a plurality of cell types, such that cells of the same type are separated by at least a predetermined minimum reuse distance;
determining, at the network operating centre, a second re-use scheme in which the cells are divided into a plurality of groups each comprising a plurality of contiguous cells, each group having one of a plurality of group types, such that groups of the same type are separated by at least said minimum re-use distance;
dividing, at the network operating centre, the plurality of carriers into at least first and second carrier pools; and
allocating the first and second pools respectively under the first and second re-use schemes such that the first pool is divided into a plurality of first carrier sets allocated respectively to the plurality of cell types and the second pool is divided into a plurality of second carrier sets allocated respectively to the plurality of group types.

22. The method of claim 21, wherein the allocation of the plurality of carriers is divided between the first and second carrier pools according to a predicted demand among said cells.

23. The method of claim 21, wherein a constant level of said carriers is allocated to each of the cells under said first re-use scheme.

24. The method of claim 23, wherein said constant level corresponds substantially to a constant component of said predicted demand across the cells.

25. The method of claim 21, further comprising, for each of said group types, determining a maximum static demand level, determining a proportion of said predicted demand above said constant level up to said maximum static demand level, and dividing said carriers to the second pool so as to satisfy said proportion of the predicted demand.

26. A method of allocating a plurality of carriers to a plurality of cells in a wireless cellular communications system, the method comprising:
    determining, at a network operating centre, a first re-use scheme in which the cells are divided into a plurality of cell types, such that cells of the same type are separated by at least a predetermined minimum re-use distance, wherein a constant level of said carriers is allocated to each of the cells under said first re-use scheme;
    determining, at the network operating centre, a second re-use scheme in which the cells are divided into a plurality of groups each comprising a plurality of contiguous cells, each group having one of a plurality of group types, such that groups of the same type are separated by at least said minimum re-use distance;
    dividing, at the network operating centre, the plurality of carriers into at least first and second carrier pools according to a predicted demand among the cells; and
    allocating, at the network operating centre, the first and second carrier pools respectively under the first and second re-use schemes such that the first carrier pool is divided into a plurality of first carrier sets allocated respectively to the plurality of cell types and the second carrier pool is divided into a plurality of second carrier sets allocated respectively to the plurality of group types;
    for each of said group types, determining, at the network operating centre, a maximum static demand level, determining a proportion of said predicted demand above said constant level up to said maximum static demand level, and dividing said carriers to the second carrier pool so as to satisfy said proportion of the predicted demand; and
    determining, at the network operating centre, a third re-use scheme in which the cells are divided into a plurality of further groups each comprising a plurality of contiguous cells, each further group having one of a plurality of further group types, such that third groups of the same type are separated by at least said minimum re-use distance, wherein the further groups are not coterminous with the groups of the third re-use scheme; allocating to a third carrier pool at least some of the carriers not allocated to the first and second carrier pools; and allocating the third carrier pool under the third re-use scheme by dividing the third carrier pool into a plurality of third carrier sets allocated respectively to said plurality of further group types.

27. The method of claim 26, including determining a peak demand comprising said predicted demand above said maximum static demand level, wherein said carriers are allocated to said third carrier pool so as to satisfy said peak demand.

28. A method of allocating a plurality of carriers to a plurality of cells in a wireless cellular communications system, the method comprising:
    determining, at a network operating centre, a re-use scheme in which the cells are divided into a plurality of groups each comprising a plurality of contiguous cells, each group having one of a plurality of group types, such that groups of the same type are separated by at least a minimum re-use distance;
    determining, at the network operating centre, a further re-use scheme, in which the cells are divided into a plurality of further groups each comprising a plurality of contiguous cells, each further group having one of a plurality of further group types, such that further groups of the same type are separated by at least said minimum re-use distance, and
    dividing, at the network operating centre, some or all of the carriers between a carrier pool and a further carrier pool allocated respectively under the re-use scheme and the further re-use scheme such that the further carrier pool satisfies a predicted peak demand among said cells.

29. The method of claim 28, wherein the allocation of said further carrier pool under said further re-use scheme includes a priority weighting between said cells.

30. The method of claim 29, wherein said priority weighting is dependent on the relative size of said peak demand between the respective cells.

31. The method of claim 29, wherein the allocation of said further carrier pool between said cells under said further re-use scheme is dependent on the relative timing of said predicted peak demand between the respective cells.

32. The method of claim 29, including determining borrowing priorities between said carrier pools.

33. The method of claim 32, wherein said borrowing priorities are dependent on the predicted excess capacity of said pools.

34. The method of claim 32, wherein said borrowing priorities include borrowing priorities between cells and/or groups of each said re-use scheme.

35. A method of allocating a plurality of carriers to a plurality of cells in a wireless cellular communications system, the method comprising:
    determining, at a network operating centre, a first re-use scheme in which the cells are divided into a plurality of first types, such that cells of the same first type are separated by at least a predetermined minimum reuse distance;
    determining, at the network operating centre, a second re-use scheme in which the cells are divided into a plurality of second groups each comprising a plurality of contiguous cells, each second group having one of a plurality of second group types, such that second groups of the same type are separated by at least said minimum re-use distance;
    determining, at the network operating centre, a third re-use scheme in which the cells are divided into a plurality of third groups each comprising a plurality of contiguous cells, each third group having one of a plurality of third group types, such that third groups of the same type are separated by at least said minimum re-use distance, wherein said third groups are not coterminous with the second groups; and dividing, at the network operating centre, some or all of the allocation of the plurality of carriers between the first, second and third re-use schemes.

36. A method of allocating a plurality of carriers to a plurality of cells in a wireless cellular communications system, in which the allocation, determined by a network operating centre, of at least one of the carriers is shared between two or more of said cells, separated by less than a predetermined reuse distance, according to a weighting factor of each of said two or more cells.

37. The method of claim 36, wherein said weighting factor is dependent on one or more of the predicted load, the predictability of the load and the density of users in the corresponding cell.

38. The method of claim 36, further including outputting carrier allocation data representing the allocation of the carriers to the cells.

39. Carrier allocation data output by the method of claim 38 embodied in a computer readable medium.

40. A method of assigning a plurality of carriers to a plurality of wireless communication devices in a plurality of cells of a wireless communications system, comprising:
receiving, at a network operating centre, some or all of the carrier allocation data of claim 39, and
assigning, at the network operating centre, the carriers to the wireless communication devices according to the received carrier allocation data and the location of said wireless communication devices within the cells.

41. The method of claim 40, including transmitting assignment signals representing the assignment of the carriers to the wireless communication devices.

* * * * *